United States Patent [19]

Shirodkar

[11] Patent Number: 5,530,072

[45] Date of Patent: Jun. 25, 1996

[54] INTRODUCTION OF LONG CHAIN BRANCHING INTO LINEAR POLYETHYLENES

[75] Inventor: Pradeep P. Shirodkar, Belle Mead, N.J.

[73] Assignee: Mobil Oil Corporation, Fairfax, Va.

[21] Appl. No.: 424,848

[22] Filed: Apr. 19, 1995

[51] Int. Cl.$^6$ .................................................. C08F 8/00
[52] U.S. Cl. ................ 525/333.8; 525/340; 525/374; 525/387
[58] Field of Search ........................... 525/340, 374, 525/387, 333.8

[56] References Cited

U.S. PATENT DOCUMENTS

| | | | |
|---|---|---|---|
| 3,376,238 | 4/1968 | Gregorian et al. | 260/2.5 |
| 3,622,554 | 11/1971 | Behr et al. | 260/2.5 |
| 3,631,161 | 12/1971 | Fan et al. | 260/94.9 |
| 3,764,628 | 10/1973 | Gregorian et al. | 260/610 R |
| 3,923,947 | 12/1975 | Cook | 264/141 |
| 4,006,283 | 2/1977 | MacKenzie, Jr. et al. | 526/57 |
| 4,015,058 | 3/1977 | Schober | 526/57 |
| 4,202,790 | 5/1980 | Steller | 252/186 |
| 4,226,905 | 10/1980 | Harbourne | 428/220 |
| 4,578,431 | 3/1986 | Shaw et al. | 525/387 |
| 5,405,917 | 4/1995 | Mueller, Jr. et al. | 525/333.8 |

*Primary Examiner*—Bernard Lipman
*Attorney, Agent, or Firm*—Alexander J. McKillop; Malcolm D. Keen; Marina V. Schneller

[57] ABSTRACT

Invention process substantially improves the modification efficiency of peroxides through proper selection of antioxidant additives and extrusion environment.

7 Claims, No Drawings

INTRODUCTION OF LONG CHAIN BRANCHING INTO LINEAR POLYETHYLENES

FIELD OF THE INVENTION

The invention relates to altering linear polyethylenes to provide them with long chain branching. The invention relates to a product produced by a process comprising contacting a linear polyethylene with a peroxide and a solid antioxidant in the presence of nitrogen to introduce long chain branching into the linear backbone of linear polyethylenes.

SUMMARY OF THE INVENTION

The process of the invention provides a method of crosslinking resins in the presence of both primary and secondary antioxidants in a single step. The use of a nitrogen blanket significantly improves the efficiency of the high temperature peroxide. In accordance with the invention, significantly high increase in viscosity, as measured by $I_2$ or dynamic viscosity at significantly low levels of peroxide. This process can be implemented over a wide range of compounding equipment with a variety of polyethylene resins produced by Ziegler, chromium or metallocene catalyst.

DETAILED DESCRIPTION OF THE INVENTION

In accordance with the invention, the untreated uncrosslinked polyethylene is contacted with a peroxide and an antioxidant under a nitrogen blanket at the feed hopper at a temperature of 180°–300° C. The amount of the antioxidant will range from 100 to 3000 ppm based on the blend of HDPE, antioxidants and peroxide.

The LLDPE is compounded with primary and secondary antioxidant. The role of antioxidant stabilizers in polyethylene is to protect the polymer from oxidative degradation after compounding and thus preserve its strength properties. The mechanism for degradation of polyethylene via oxidation is an autocatalyzed, free radical chain process. During this process hydroperoxides are formed which decompose into radicals and accelerate the degradation. Antioxidants prevent this degradation by (1) scavenging radicals to interrupt the oxidative chain reaction resulting from hydroperoxide decomposition and (2) consuming hydroperoxides.

The primary antioxidants contain one or more reactive hydrogen atoms which tie up free radicals, particularly peroxy radicals, forming a polymeric hydroperoxide group and relatively stable antioxidant species. The phenolic antioxidants are the larges selling primary antioxidant used in plastics today; they include simple phenols, bisphenols, thiobisphenols, and polyphenols. Hindered phenols such as Ciba Geigy's Irganox 1076, 1010, and Ethyl 330 fulfill the first requirement and are considered primary antioxidants. Others include:
2,6-Bis(1-methylheptadecyl)-p-cresol Butylated hydroxyanisole [BHA], [$(CH_3)_3CC_6H_3OH(OCH_3)$]
Butylated hydroxytoluene [BHT], [DBPC], [Di-t-butyl-p-cresol]
Butylated octylated phenol
4,4'-Butylidenebis(6-t-butyl-m-cresol) [Santowhite powder]
2,6-Di-t-butyl methylamino-p-cresol
Hexamethylenebis(3,5-di-t-butyl hydroxy-cinnamate) [Irganox 259]
2,2'-Methylenebis(4-methyl-6-t-butyl phenol) [CAO 5], [Bis(2-Hydroxy- 3-t-butyl-5-methyl phenyl)methane], [Cyanox 2246]
Octadecyl 3,5-di-t-butyl-4-hydroxyhydrocinnamate [Irganox 1076]
Tetrakis (methylene (3,5-di-t-butyl-4-hydroxyhydrocinnamate) methane [Irganox 1010]
4,4'-Thiobis (6-t-butyl-m-cresol) [Santonox]
Thiodiethylenebis(3,5-di-t-butyl-4-hydroxy)hydrocinnamate [Irganox 1035]
1,3,5-Tris(4-t-butyl-3-hydroxy-2,6-dimethylbenzyl)1,3,5-triazine- 2,4,6-(1H, 3H, 5H)-trione [Cyanox 1790]
Tris(2-methyl-4-hydroxy-5-t-butylphenyl)-butane [Topanol CA]

PROPRIETARY PHENOLICS

Antioxidant MBP-5P, 5T
Antioxidant SP
Antioxidant TBE-9
Antioxidant TBM-6P, 6T [Thiophenol]
CAO-42
Escoflex A-122, A-123
Hostanox 03
Isonox 129 [bisphenolic]
MO-14
Naugard 431 [hindered phenolic]
Naugard XL-1
Prodox 120
Prodox 147
Prodox 247
Prodox 340, 341, 343
Prodox B113
Prodox B121
Stabilite 49-467, 49-470
Uvi-Nox 1492
Vanox GT
Vanox SKT
Vanox 1290, 1320
Wingstay C
Wingstay L [polymeric hindered phenol]
Wingstay S [styrenated phenol]
Wingstay T
Wingstay V
Naugard P, PHR
Weston 399
Weston 626
Weston 430, 474, 491, 494, DHOP, PTP, PNPC, THOP
Tetrakis(2,4-di-t-butyl)phenyl-(1,1-bi-phenyl)-4,4'-diylbisphosphite [Sandostab P-EPQ]
Triisodecyl phosphite [Weston TDP]
Triisooctyl phosphite [Weston TIOP]
TriLauryl phosphite [Weston TLP]
Trisnonylphenyl phosphite
Didecyl phosphite
Di Lauryl phosphite [$(C_{12}H_{29}O)_2PHO$]
Trisnonylphenyl phosphite/formaldehyde polymer [Wytox 438]
Wytox 320 (alkylaryl phosphite)

The major group of secondary antioxidants include phosphorus-based antioxidants, generally phosphites. The phosphite acts by converting hydroperoxides to non-chain propagating alcohols, while the phosphite itself is oxidized to phosphates. These additives are chosen when processing stability is of concern. Trisnonylphenyl phosphite is the most widely used phosphite. Typical secondary antioxidants are GE's Weston TNPP, Ciba Geigy's Ultranox 626 and Irgafos 168. An exhaustive list of primary and secondary antioxidants can be found in the reference [*Chemical Additives for the Plastics Industry,* Radian Corporation, Noyes Data Corporation, N.J., 1987.] Others include:

Tetrakis(2,4-di-t-butyl)phenyl-(1,1-bi-phenyl)-4,4'-diylbis-phosphite [Sandostab P-EPQ];
Triisodecyl phosphite [Weston TDP];
Triisooctyl phosphite [Weston TIOP];
TriLauryl phosphite [Weston TLP];
Trisnonylphenyl phosphite;
Didecyl phosphite;
Di Lauryl phosphite [$(C_{12}H_{29}O)_2PHO$];
Trisnonylphenyl phosphite/formaldehyde polymer [Wytox 438]; and
WytoX 320 (alkylaryl phosphite).

In accordance with the invention, the mixture of primary antioxidant and secondary antioxidant in the LLDPE may comprise up to 3000 ppm of the blend.

Preferably, the antioxidant is a solid at ambient conditions.

The amount of peroxide will range from 10 to 1000 ppm based on the blend of HDPE, antioxidant and peroxide.

However, preferably, the peroxide amount ranges from 10 to 500 based on the PE weight. Most preferably, the peroxide of the blend is about 10–300 ppm.

The types of peroxides which are used are high temperature peroxides that can undergo almost complete decomposition at normal compounding temperatures (200°–260° C.). The half life temperature at 0.1 hours should be greater than 130° C. Half life temperature at a given time is the temperature at which one half of the peroxide has decomposed. Suitable but non-limiting examples of such peroxide are: dicumyl peroxide, 2,5-dimethyl-2,5-di-(tert butyl peroxy) hexane, tert-butyl cumyl peroxide, di-(2-tert-butylperoxy-isopropyl) benzene, di-tert-butyl peroxide, 2,5-dimethyl-2, 5-di-(tert-butylperoxy)hexyne- 3, cumene hydroperoxide these contain 2 to 20 carbon atoms. The peroxide may be preblended with the PE or introduced separately as a liquid feed using any of various methods known in the art.

Treatment of the polyethylene must be undertaken under nitrogen. Nitrogen will be introduced to the zone of polyethylene treatment in accordance with the invention at the feed throat of the compounding extruder so as to minimize exposure to oxygen. Compounding under this condition significantly enhances the crosslinking efficiency of the peroxide.

The polyethylene employed as the reactant to be treated in accordance with the invention may be either high density polyethylene, sometimes designated by the acronym "HDPE", or linear low density polyethylene sometimes designated by the acronym "LLDPE". The HDPE will have a specific gravity of about 0.94 to 0.97 g/cc whereas the LLDPE will have a specific gravity of about 0.89 up to about 0.94 g/cc. Accordingly, polyethylenes which can be used herein will have a density in the range of 0.89 to 0.97 [ASTM D-1505]. These linear polyethylenes have a substantially linear backbone and contain substantially no long branching. Accordingly, the reactant polyethylene may be either a homopolymer of ethylene or a copolymer of ethylene and an alpha olefin of 3 to 10 carbon atoms preferably an alpha olefin of 4 to 10 carbon atoms. Preferred monomers include an olefin, preferably a 1-olefin, containing 3 to 10 carbon atoms, e.g., 1-propene, 1-butene, 1-pentene, 1-hexene, 4 -methyl-1-pentene, 1-heptene, and 1-octene. The preferred olefin comonomers are 1-butene, 1-hexene and 1-octene; when the polyethylene resin contains comonomers the resin will contain at least 80 preferably at least 90 mole percent ethylene units. The process of the invention can be implemented over a wide range of polyethylene resins produced by Ziegler, chromium or metallocene catalysts, as indicated by the Examples below.

The polyethylene employed as the reactant to be treated usually has less shear thinning (dependence of viscosity on shear rate) than the peroxide treated product of the invention. The MFR [which is the ratio $I_{21}/I_2$ measured according to ASTM D-1238 conditions E for $I_2$ and F for $I_{21}$] is a reflection of shear thinning; shear thinning appears to increase with increasing numerical value of MFR.

The polyethylene employed as the reactant to be treated has a lower dynamic viscosity than the product realized by the process of the invention. The dynamic viscosity is measured at 190° C. using dynamic melt rheometers as outlined in ASTM D4440-84. The increase in viscosity is based on that of the untreated LLDPE.

The polyethylene employed as the reactant in the process of the invention has a higher $I_2$ than the product of the process. That is, the effect of the process of the invention is to decrease the $I_2$ of polyethylene. Since $I_2$ is inversely related to the low shear rate viscosity [ASTM D-1238 Condition E] of the resin, the decrease in I2 reflects the increase in viscosity as a result of peroxide use. The significantly larger decrease in I2 with the nitrogen blanket (sample B, Example 1) illustrates the increased crosslinking efficiency of the peroxide in the presence of a nitrogen blanket.

The product polyethylenes, whether hompolymers or copolymers, will contain long chain branching. The presence of long chain branching will significantly increase the low shear viscosity of the polyethylene. This increase in viscosity translates into higher melt tension during stretching of the PE melt. The increased melt tension allows for the PE to be used in applications which were not readily possible before, such as sheet extrusion, high stalk film blowing, foaming and blow molding.

The presence of long chain branching in the products of the invention, produced by the process of the invention, is indicated by the sharp increase in low shear rate viscosity, decrease in $I_2$ and increase in MFR when compared to the base resin. In accordance with the invention, the amount of long chain branching which can be introduced can be measured in terms of the changes in these properties.

| Property | Broad Range | Preferred Range | Most Preferred Range |
|---|---|---|---|
| % Increase in Dynamic Viscosity at 0.1 frequency over base | 25–1000% | 25–500% | 50–300% |
| % Decrease in $I_2$ over base | 15–500% | 20–200% | 25–100% |
| % Increase in MFR over base | 15–500% | 20–200% | 25–100% |

The process of the invention can be implemented over a wide range of compounding equipment with a variety of polyethylene resins, both homopolymers and copolymers of a density in the range of 0.89 to 0.97, produced by Ziegler, chromium or metallocene catalyst, as indicated by the Examples below. Also, while nitrogen is used to provide an inert atmosphere at the feed throat of the extruder, any other inert (non-oxidizing) gases could also be utilized.

EXAMPLES

Example 1

Granular LLDPE (0.9 MI, nominal 0.918 density 1-hexene copolymer) resin produced with a Ziegler catalyst is mixed in with 500 ppm Irganox 1010 and 500 ppm of Irgafos 168. We studied the effect of peroxide addition and a nitrogen blanket in the feed hopper during compounding. We used Trigonox 101 E5 (supplied by Akzo) a 5 percent solution in mineral oil for these experiments. The peroxide was added as a 1 percent masterbatch in a granular LLDPE resin. The mixtures were compounded on a laboratory ¾" Brabender twin screw extruder at 220° C. and 25 RPM. The following table illustrates the influence of peroxide and nitrogen blanket:

| Sample | Peroxide Level ppm | Nitrogen Blanket | I2 | I21/I2 | % Decrease in I2 | % Increase in $I_{21}/I_2$ |
|---|---|---|---|---|---|---|
| A | 0 | Yes | .89 | 24.7 | — | — |
| B | 100 | Yes | .26 | 53.6 | 70.8 | 117 |
| C | 100 | No | .55 | 35.3 | 38.2 | 42.9 |

The significantly larger decrease in I2 with the nitrogen blanket (sample B) illustrates the increased crosslinking efficiency of the peroxide in the presence of a nitrogen blanket. Since I2 is inversely related to the low shear rate viscosity of the resin, the decrease in I2 reflects the increase in viscosity as a result of peroxide use.

Example 2

The compounding conditions were similar to those used in Example 1. The only changes were that a HDPE (0.58 MI, nominal 0.953 density 1-hexene copolymer) polymerized with a chromium oxide catalyst was used as a feedstock instead of the LLDPE and with no secondary antioxidant. Only 500 ppm of Irganox 1010 was used. The results were as follows:

| Sample | Peroxide Level ppm | Nitrogen Blanket | I2 | I21/I2 | % Decrease in I2 | % Increase in $I_{21}/I_2$ |
|---|---|---|---|---|---|---|
| D | 0 | Yes | .58 | 72.4 | — | — |
| E | 100 | Yes | .09 | 213 | 84.5 | 194.2 |
| F | 100 | No | .24 | 128 | 58.6 | 76.8 |

Similar to Example 1, the sample (E) with the nitrogen blanket gave a substantially larger decrease in I2 (or an increase in viscosity). The use of nitrogen blanket increases the crosslinking efficiency of the peroxide.

Example 3

This example illustrates the importance of selecting the proper secondary antioxidant to enhance the crosslinking efficiency of the peroxides. The compounding conditions were similar to that employed in Example 1, except for a different LLDPE feedstock (0.8 MI, 0.918 density 1-hexene copolymer) and all samples had a nitrogen blanket on the feed throat of the hopper. The primary antioxidant Irganox 1010 was present at 500 ppm and the selected secondary antioxidant (phosphite) was also at 500 ppm.

| Sample | Peroxide Level ppm | Secondary Antioxidant | I2 | I21/I2 | % Decrease in I2 | % Increase in $I_{21}/I_2$ |
|---|---|---|---|---|---|---|
| G | 0 | Irgafos 168 | .8 | 27 | — | — |
| H | 100 | Weston 399 | .6 | 31.6 | 25 | 17 |
| I | 100 | Irgafos 168 | .29 | 48.9 | 63.8 | 54.7 |

Comparison of Samples H and I, suggests that the choice of the secondary antioxidant has an important bearing on the efficiency of the peroxide crosslinking (measured by percentage of I2 decrease). Weston 399 which is a liquid at room temperature is dispersed quite effectively and curtails the crosslinking efficiency of the radicals generated by the peroxide. Irgafos 168 which is a solid (melting point 180°–185° C.) does not disperse as fast and thus allows the peroxide radicals to participate in the crosslinking of the polyethylene molecules. Thus solid antioxidants are preferred in this invention.

Example 4

In this example, we illustrate the use of the invention process in introducing low levels of long chain branches in a metallocene catalyzed LLDPE resin. We used a base LLDPE metallocene catalyzed (1-hexene copolymer) LLDPE granular resin with a I2 (MI) of 0.8, I21/I2 of 17 and a nominal density of 0.917. The granular LLDPE was preblended with 100 ppm of peroxide (used as granular masterbatch) 500 ppm Irganox 1010, and 500 ppm of Irgafos 168. The mixture was compounded on the 2 inch Brampton single screw extruder at 75 lbs/hr at 465° F. with a nitrogen blanket at the feed throat. The resultant pelletized LLDPE (sample J) had the following properties:

I2 = .44
I21/I2 = 23
Percentage decrease in I2 = 45%
Percentage increase in $I_{21}/I_2$ = 35%

Percentage increase in dynamic viscosity at 0.1 sec-1 @190° C. =122.5%. The percentage increase in viscosity was measured relative to the base untreated granular LLDPE resin. Dynamic viscosity is measured by a procedure described in ASTM D4440-84.

The presence of long chain branching is indicated by the sharp increase in low shear rate viscosity, decrease in I2 and increase in MFR when compared to the base metallocene catalyzed LLDPE resin.

Example 5

In this example, we illustrate a large scale method of implementing the invention process. We used the 4 inch Farrel compounder for the purpose. 500 ppm of Irganox 1010 and 500 ppm Irganox 168 were dry-blended with the base LLDPE (nominal 0.65 MI, 0.922 density 1-hexene copolymer, $I_{21}/I_2$ of 27, dynamic viscosity at 0.1 sec-1 measured at 190° C. of 123,200 poises). Instead of using a peroxide granular masterbatch described in the previous examples, we injected the 5% Trigonox solution in mineral oil (supplied by Akzo) directly into the Farrel mixer chamber. The flow rate of the peroxide solution was adjusted to obtain the desired level in the final polymer. Full nitrogen flow was employed on the hopper. The compounding rate was 550 lbs/hr with the specific energy input (SEI) of 0.11 (hp.hr)/lb. The melt temperature in the mixer was approximately 460° F. We obtained the following results:

| Sample | Peroxide Level ppm | I2 | I21/I2 | % I2 Decrease | Viscosity @.1 1/sec poises (1) | % Viscosity Increase (1) | % Increase in I21/I2 |
|---|---|---|---|---|---|---|---|
| K | 100 | .26 | 46 | 60 | 369,500 | 200 | 70 |
| L | 150 | .14 | 70 | 78.5 | 630,400 | 412 | 160 |

Note 1: The dynamic viscosity is measured at 190° C. using dynamic melt rheometers as outlined in ASTM D4440-84.

The increase in viscosity is based on that of the untreated LLDPE.

The invention process provides a highly effective means of modifying the base polyethylene even at the low levels of 100 ppm of the peroxide and in the presence of both the primary and secondary antioxidants.

Thus it is apparent that there has been provided, in accordance with the invention, a process and product, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for introducing long chain branching and for crosslinking an uncrosslinked polymer of ethylene or copolymer of ethylene and an alpha olefin of 3 to 10 carbon atoms, comprising admixing a base resin comprising an uncrosslinked polymer of ethylene or copolymer of ethylene, antioxidants and high temperature peroxide, which has a half life temperature at 0.1 hours which is greater than 130° C., in an inert atmosphere at the feed throat of the extruder, with a melt temperature of 180°–300° C., wherein the amount of high temperature peroxide is 10–1000 ppm wherein the total amount antioxidants is 100–3000 ppm;

allowing increase in the numerical value of $I_{21}/I_2$ [measured at 190° C., according to ASTM 1238], of 15–500% over base resin, a decrease in the $I_2$ numerical value of 15–500% over base, and increase in the dynamic viscosity [measured ASTM D4440-84] of 25–1000% over base resin;

recovering a product which contains long chain branching.

2. The process of claim 1, wherein the uncrosslinked homopolymer or copolymer has a specific density of 0.89 up to about 0.97.

3. The product produced by the process of claim 1.

4. The product produced by the process of claim 2.

5. The process of claim 1, wherein the antioxidants are solid at room temperature.

6. Product from the process of claim 5.

7. The process of claim 1, wherein the uncrosslinked PE is produced by the use of Ziegler, chromium based or metallocene catalysts and mixtures thereof.

* * * * *